United States Patent [19]

Harms et al.

[11] Patent Number: 5,079,488
[45] Date of Patent: Jan. 7, 1992

[54] ELECTRONICALLY COMMUTATED MOTOR DRIVEN APPARATUS

[75] Inventors: Harold B. Harms, Fort Wayne, Ind.; Richard F. Broo, Farmington Hills, Mich.; William M. Hood, Akron, Ohio

[73] Assignee: General Electric Company, Fort Wayne, Ind.

[21] Appl. No.: 397,137

[22] Filed: Aug. 22, 1989

Related U.S. Application Data

[62] Division of Ser. No. 160,526, Feb. 26, 1988, Pat. No. 4,876,492.

[51] Int. Cl.$^5$ .......................... F01P 7/16; F04B 35/04
[52] U.S. Cl. .................... 318/471; 318/254; 417/32; 417/356; 417/423.7; 123/41.02; 123/41.44
[58] Field of Search ............... 318/254, 471, 472, 473; 123/41.01, 41.02, 41.05, 41.44, 41.46, 41.56, 41.57, 41.58, 41.63, 41.65; 417/13, 32, 292, 355, 356, 423.7

[56] References Cited

U.S. PATENT DOCUMENTS

| | | | |
|---|---|---|---|
| 2,606,540 | 8/1952 | Tchaoussoglou | 123/41.63 |
| 3,357,413 | 12/1967 | Quinton | 123/41.57 |
| 3,708,251 | 1/1973 | Pierro | 417/356 |
| 3,938,913 | 2/1976 | Isenberg et al. | 417/356 |
| 4,123,666 | 10/1978 | Miller | 417/356 |
| 4,156,407 | 5/1979 | Moll et al. | 123/41.46 X |
| 4,212,270 | 7/1980 | Nakanishi et al. | 123/41.46 X |
| 4,257,395 | 3/1981 | Wieder | 417/32 X |
| 4,257,745 | 3/1981 | Thur et al. | 417/32 X |
| 4,434,749 | 3/1984 | Morita et al. | 123/41.44 X |
| 4,650,633 | 3/1987 | Youngborg | 417/292 X |

FOREIGN PATENT DOCUMENTS 62-99688  5/1987  Japan .................................... 417/32

Primary Examiner—Bentsu Ro
Attorney, Agent, or Firm—Ralph E. Krisher, Jr.

[57] ABSTRACT

An apparatus for pumping fluid such as an integral pump/motor is provided. A housing having an inlet and an outlet has a rotatable assembly including an impeller located within and adapted to rotate within the housing to move fluid through the housing from the inlet to the outlet. Secured to the exterior of the housing is a stationary assembly for applying an electromagnetic field through the housing to and around the impeller to rotate the impeller and thereby to cause it to move fluid through the housing.

The apparatus is for use in a cooling system, such as a cooling system of an automobile engine, to pump fluid through the cooling system. A temperature sensor is provided for sensing the temperature of the fluid within the cooling system. An electronic control, responsive to the temperature sensor, supplies electrical power to stationary assembly.

Also, a method of circulating fluid within a system, such as a cooling system of an automobile engine, is disclosed. An electromagnetic field is applied through a housing to and around a rotatable assembly including an impellar located in the housing thereby to axially rotate the impeller and cause it to move fluid through the housing.

12 Claims, 5 Drawing Sheets

ELECTRONICALLY COMMUTATED MOTOR DRIVEN APPARATUS

This application is a division of U.S. patent application Ser. No. 07/160,526, filed Feb. 26, 1988, now U.S. Pat. No. 4,876,492.

FIELD OF THE INVENTION

The invention relates generally to dynamoelectric machines that utilize electronic commutation means and, more particularly, such machines integral with an apparatus to be driven such as a pump.

BACKGROUND OF THE INVENTION

Electronically commutated motors have been used to drive various types of apparatus, such as pumps, by directly or indirectly coupling a shaft extending from the rotor assembly of the motor to the drive shaft of the pump. As the piston or impeller of the pump is in contact with the fluid to be pumped a fluid seal is needed around the pump drive shaft or extension thereof to prevent fluid leakage. Such fluid seals generally require maintenance and wear with use thus increasing the likelihood of fluid leakage.

One of the most widely used types of pump is the automotive "water" (antifreeze/coolant) pump in which a pulley keyed to a shaft carrying the pump impeller is driven by the automobile engine via a belt and pulley coupling. Such pumps require fluid seals around the pump shaft which present a significant maintenance problem. Existing conventional water pumps tend to have the seals and bearings fail long before other engine components. A significant factor in such failures is the side load on bearings and seals from the belt and pulley drive, and this tends to allow pressurized coolant to leak out of the system and cause bearing seizure. Replacement costs in both labor and parts is high.

As such pumps can only operate when the engine is operating, pumping of the fluid through the cooling system ceases when the engine stops resulting in sharply rising engine block temperatures from the heat being built up in the fluid within the block. There is a concomitant and excessive under-hood temperature increase, particularly in transverse mounted engines, front wheel drive automobiles and other engines which have high operating temperatures to reduce hydrocarbon and carbon monoxide emissions. Increased under-hood temperatures significantly reduce the useful life of rubber and plastic parts in the engine compartment.

Additionally, such pumps always operate when the engine is operating thereby requiring thermostatic valves to control fluid flow within the cooling system. Thermostatic valves inhibit fluid flow until the fluid reaches operating temperature so that the engine and fluid surrounding it quickly reach the optimum operating temperature.

SUMMARY OF THE INVENTION

Among the several objects of the invention may be noted the provision of a new and improved integral electronically commutated motor/pump for use in pumping fluid, such as the coolant in an automobile engine cooling system; the provision of such an integral motor/pump which avoids the need for fluid seals around rotating shafts; and in which no unsymmetrical or side loads must be carried by rotating shafts; the provision of an automotive "water" pump which can be selectively operated during and subsequent to engine operation thereby providing coolant flow which is independent of engine operation, reduces sharply rising engine block temperature when the engine is first turned off and is responsive to the temperature of the fluid within the cooling system thereby eliminating the need for a thermostat, a high maintenance item; the provision of an integral axial flow, variable output, permanent magnet, electronically commutated motor driven automotive "water" pump with pumping parts made of synthetic resin so that the pump is lightweight and can be located at various points within the cooling system and operates at a low noise level; the provision of an integral pump/motor for use in an automotive cooling system which will circulate only the amount of coolant through the engine and radiator necessary to maintain the system operating temperature within a specified range; the provision of such an integral pump/motor for automotive cooling systems which is economical in cost, reliable in operation and has reduced replacement cost; and the provision of an improved method for circulating coolant through an automobile engine cooling system.

These as well as other objects and advantageous features will be in part apparent and in part pointed out hereinafter.

In general, in one form of the invention apparatus for pumping fluid is provided which includes a housing having an inlet and an outlet and means, located within and adapted to rotate within the housing, for moving fluid through the housing from the inlet to the outlet. Secured to the exterior of the housing are means for applying an electromagnetic field through the housing to and around the fluid moving means to rotate the fluid moving means and thereby to cause it to move fluid through the housing.

Also, in general, in another form of the invention apparatus for pumping fluid is provided which comprises a motor having a rotor assembly and a stator assembly. Housing means, having a fluid inlet and a fluid outlet between which an axis is defined, encloses the rotor assembly. The stator assembly is located on and surrounds the housing. Means for applying electrical power to the stator assembly are provided so that the stator assembly applies an electromagnetic field through the housing to and around the rotor assembly thereby to rotate the rotor assembly about the axis. Means driven by the rotor assembly and located within the housing axially pumps the fluid from the inlet to the outlet as the rotor assembly rotates about the axis.

Generally, and in still another form of the invention, an electronically commutated motor is provided which includes a rotatable assembly having an axis and which is supported for rotation about the axis by means which includes a housing surrounding the rotatable assembly. A stationary assembly having a plurality of winding stages surrounds the housing and are adapted, when electrically energized, to apply an electromagnetic field to the rotatable assembly to cause the rotatable assembly to rotate about the axis.

In general, in a further form of the invention, an electronically commutated motor is provided which comprises a rotatable assembly having an axis and including a cylindrical ferromagnetic member having an axial opening coaxial with the axis wherein the axial opening is adapted to receive an element to be rotated, such as an impeller. The assembly also includes a plurality of permanent magnet elements peripherally secured to the ferromagnetic member. Means coaxial with the axial opening of the ferromagnetic member support said rotatable assembly for rotation about the assembly axis. A stationary assembly having a plurality of winding stages surrounds said means. The winding stages are adapted to be electrically energized to apply an electromagnetic field to said rotatable assembly to cause the rotatable assembly to rotate about the assembly axis.

Generally, in a still further form of the invention, an apparatus for use in a cooling system, such as a cooling system of an automobile engine, to pump fluid through the cooling system is provided. The apparatus includes a housing having an inlet and an outlet adapted to be connected in the cooling system. First means, located within and adapted to rotate within the housing, move fluid within the cooling system from the inlet to the outlet. Means are also provided for sensing the temperature of the fluid within the cooling system. Second means secured on the housing applies an electromagnetic field through the housing to and around the first means thereby to rotate the first means and cause it to move fluid through the housing from the inlet to the outlet. Means, responsive to said temperature sensing means, supply electrical power to said second means.

Also in general, and in accordance with this invention, a method of circulating fluid within a system, such as a cooling system of an automobile engine is provided. A rotatable assembly including an impeller is located within a housing which is connected in the system. An electromagnetic field is applied through the housing to and around the rotatable assembly thereby to axially rotate the impeller and cause it to move fluid through the housing.

BRIEF DESCRIPTION OF THE DRAWINGS

Other objects of the present invention and their attendant advantages will become readily apparent from the following description taken in conjunction with the accompanying figures in which like reference characters are used to describe like parts throughout the several views.

DETAILED DESCRIPTION OF A PREFERRED EMBODIMENT

Figure 1:
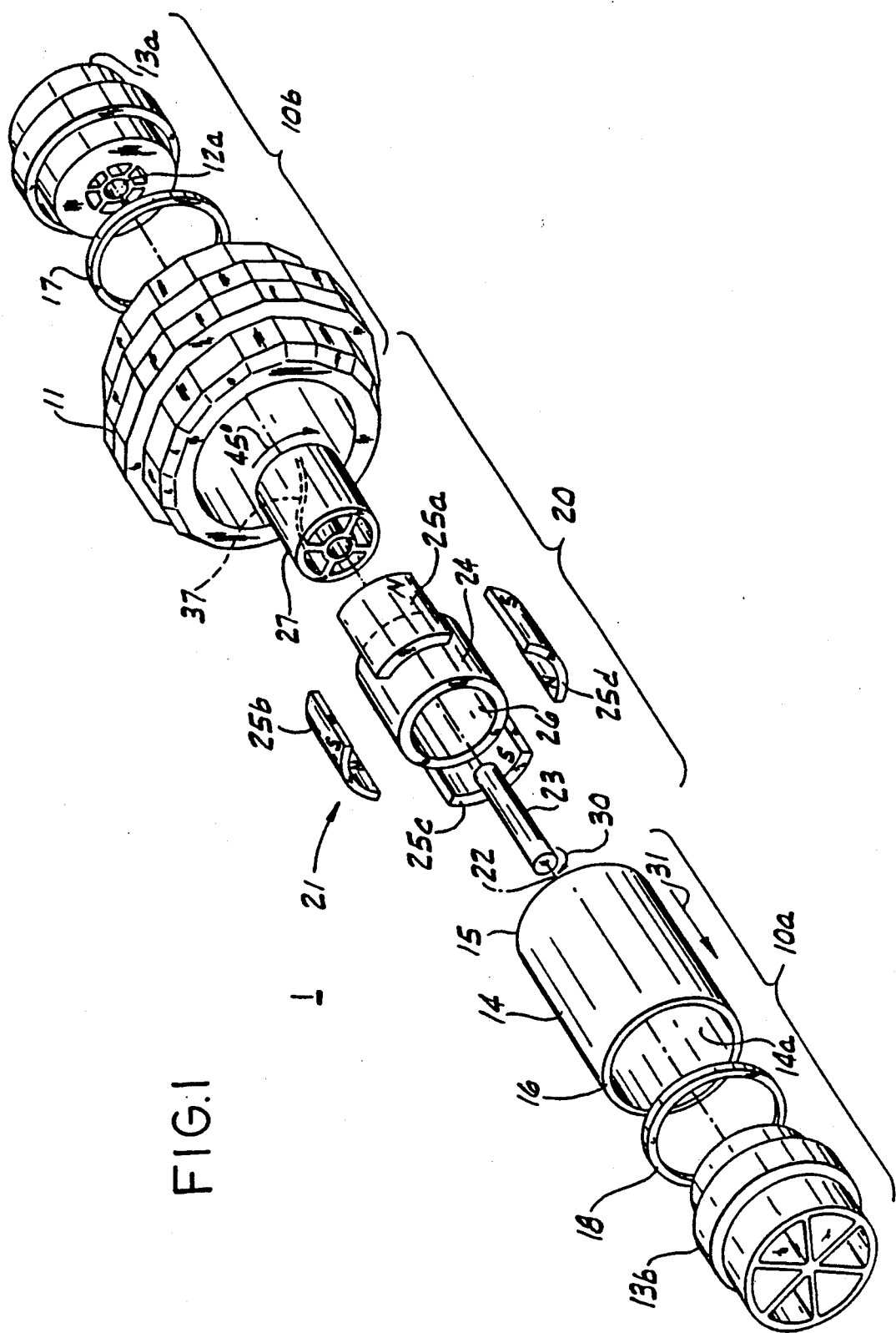
FIG. 1 is an exploded, perspective view of the main elements of an integral pump/motor embodying teachings of the present invention in one form thereof.

Referring now to the drawings, and more particularly to FIG. 1, an apparatus for Pumping fluid such as a pump integral with and driven by a brushless DC motor, i.e., an electronically commutated motor, adapted to be energized from an electrical power source is shown and generally referred to by reference character 1. The integral pump/motor 1 includes a stationary assembly 10a, 10b including core or stator assembly 11 and a rotatable assembly 20 including a permanent magnet rotor assembly 21. The rotor assembly 21 is coaxially supported for rotation about its axis 22 by impeller 27 and shaft 23. The shaft 23, journaled for rotation in and supported by bearings 12a, 12b (see FIG. 3) in inlet end cap 13a and outlet end cap 13b, is coaxial with axis 22. The rotor assembly 21 is surrounded by and rotatable within the bore 14a of a tubular core or housing 14 which provides a fluid passageway having an inlet 15 and an outlet 16. The end caps 13a, 13b are partially located within the inlet 15 and outlet 16, respectively, and are sealed to the tubular housing 14 by conventional means. For example, in one preferred embodiment it is contemplated that housing 14 and end caps 13a and 13b are made of a synthetic resin ("plastic") in which case the end cap 13a may be inductively sealed to the inlet 15 of tubular housing 14 by an inductive type (Emabond) inlet ring seal 17 and the end cap 13b may be similarly inductively sealed to the outlet 16 of housing 14 by ring seal 18. End caps 13 and shaft 23 constitute means coaxial with the assembly axis 22 for supporting the rotatable assembly 20 for rotation about its axis.

Rotor assembly 21 comprises a low reluctance core such as a ferromagnetic core in the form of a cylindrical, ferromagnetic member having an axial opening or bore 26 coaxial with the assembly axis 22. The member, generally referred to as backiron 24, is surrounded by a number of thin flat annular ferromagnetic elements or laminations secured to the outer peripheral surface of backiron 24 so as to establish constant magnetic polar regions with North-South polarizations. Four essentially identical relatively thin arcuate segments 25a, 25b, 25c, 25d of permanent magnet material (e.g., ceramic type, cobalt samarium, Alnico, Magnequench MQ 1, etc.), each providing a relatively constant flux field, are peripherally secured (for example, by adhesive bonding) to backiron 24. The segments 25 each span approximately 90 mechanical degrees and are magnetized to be polarized radially in relation to the backiron 24 with adjacent segments being alternately polarized to provide constant magnetic polar regions. For example, the outer surfaces of segments 25a and 25c may be north polarized, as partially indicated, and the outer surfaces of segments 25b and 25d may be south polarized, with the inner surfaces oppositely polarized. While segments 25 on backiron 24 are illustrated for purposes of disclosure, it is contemplated that other rotor assemblies having different constructions and other magnet elements different in both number, contruction and flux fields may be utilized with such other rotor assemblies within the scope of the invention so as to meet at least some of the objects thereof.

Backiron 24 has an axial opening therein with an axis coaxial with the rotor assembly axis 22. The axial opening defines a backiron bore 26 within which impeller 27 is positioned. Impeller 27 includes a centrally located, longitudinal opening coaxial with the rotor assembly axis 22 forming a bore within which shaft 23 is positioned. Impeller 27 is secured within the bore 26 of backiron 24, for example, by press-fitting or adhesive bonding. Rotatable assembly 20 including shaft 23, impeller 27 and the rotor assembly 21 (backiron 24 and segments 25a–d) constitute means located within and adapted to rotate within a housing, such as 14, for moving fluid through the housing from the inlet 15 to the outlet 16.

Figure 2:
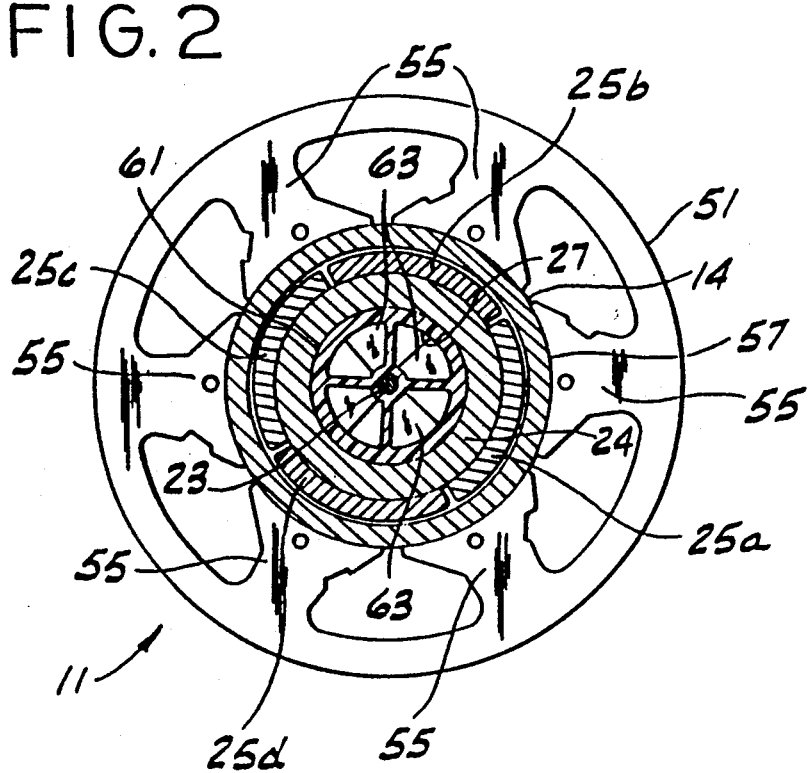
FIG. 2 is a diagrammatic front elevational view of the laminations of the stator assembly of the FIG. 1 pump/motor illustrating its rotatable assembly in cross section.
Figure 3:
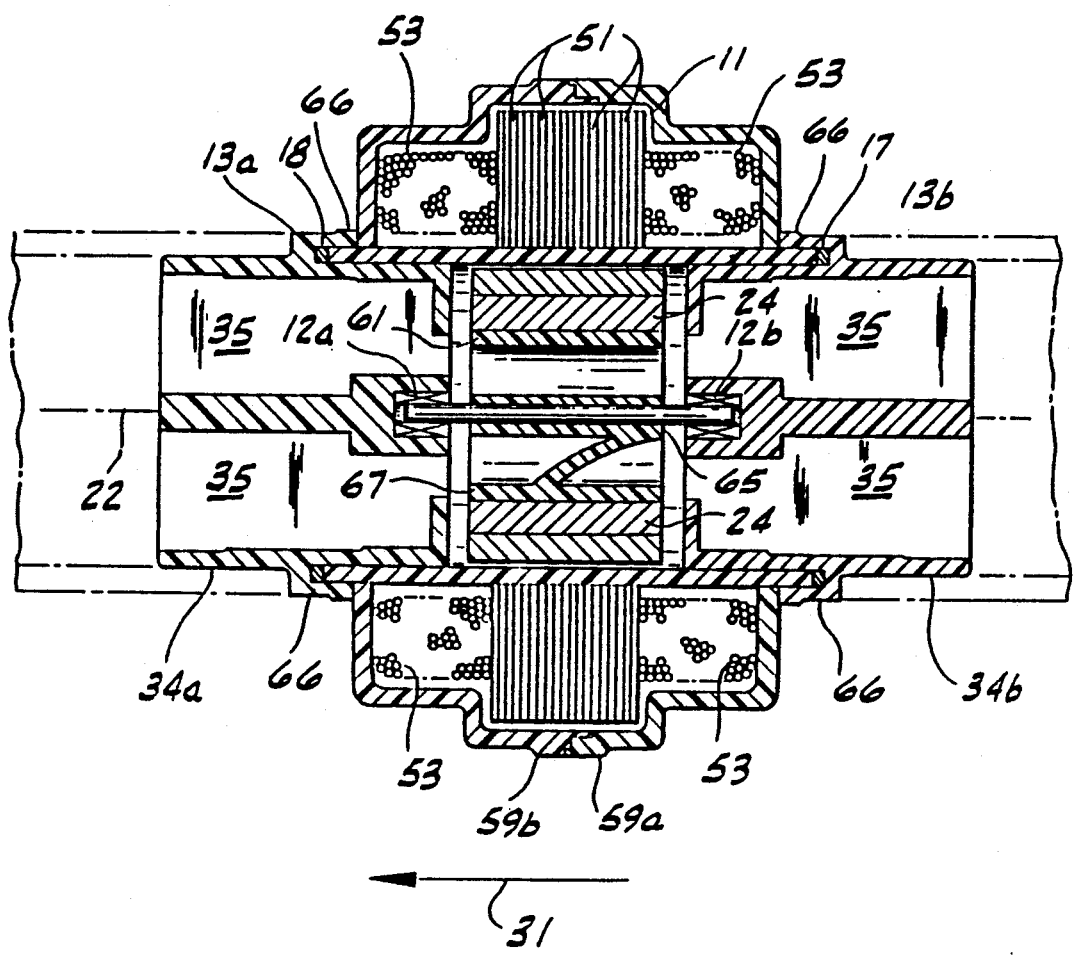
FIG. 3 is a longitudinal, cross sectional view of the integral pump/motor according to the invention.

Referring to FIGS. 2 and 3, stator assembly 11 may be fabricated of a core of thin ferromagnetic laminations 51, as is conventional in the AC motor art, which are held together by retainer clips positioned in notches (not shown) around the outer periphery of the laminations 51. Alternatively, the stator laminations may be held together by suitable means, such as for instance welding or adhesively bonding, or merely held together by the windings 53, all as will be understood by those skilled in the art. Six inwardly directed poles 55 define the stator bore 57 and six winding stages 53 disposed around the poles 55 are adapted to be selectively commutated. Winding stages 53 surround and are carried by housing 14 and are adapted to be electrically energized to apply an electromagnetic field to the rotatable assembly 20 to cause it to rotate about its axis 22. As a result, the rotatable assembly 20 is associated with the stationary assembly 10 in selective magnetic coupling relation with the winding stages 53 so as to be rotatably driven thereby. The winding terminal ends or leads (not shown) are brought out and connected separately to a control system such as a three phase, half bridge control circuit as disclosed in U.S. Pat. Nos. 4,169,990 and 4,532,459, incorporated herein by reference. While stator assembly 11 is illustrated for purposes of disclosure, it is contemplated that other stator assemblies of various other contructions having different shapes such as stators having various numbers of poles and slots therebetween may be utilized within the scope of the invention so as to meet at least some of the objects thereof.

The stator assembly 11 and rotor assembly 21 comprise an electronically commutated motor, such as a brushless DC motor or the like for instance. For purposes of disclosure, motor 1 is illustrated as a three stage, salient, six pole, brushless, DC motor but it will be understood that the motor of this invention may be a distributed wound or salient motor of 2, 4, 8, etc. pole construction and have 2, 3, 4 or more winding stages within the scope of the invention to meet at least some of the objects thereof. Stator assembly 11 including laminations 51 and winding stages 53 constitute means secured to the exterior of a housing such as 14 for applying an electromagnetic field through the housing to and around the rotatable assembly 20 to rotate it and thereby cause it to move fluid through tubular housing 14. Housing 14 is formed of a non-magnetic material such as a synthetic resin to permit the electromagnetic field to pass therethrough. In order to protect the stator assembly 11 from dirt and dust, a cover 59a, 59b having two clam shell-like portions which fit together may be used to surround the stator assembly 11.

As shown in FIGS. 2 and 3, impeller 27 constitutes means for pumping located in the axial opening (bore 26) cf backiron 24 and comprises a cylindrical member 61 having a plurality of four internal radial vanes 63 extending helically along the axis 22. From the inlet end 65 of member 61 to the outlet end 67 of member 61, the surface of each helical, radial vane 63 axially rotates through an angle of approximately 45 mechanical degrees (also shown by the dotted line 37 on the surface of impeller 27 illustrated in FIG. 1). Impeller 27 rotates on axis 22 as part of the rotatable assembly 20 due to the angular force imparted onto magnetic segments 25 by the electromagnetic field generated by the selective commutation of the winding stages which are energized from an electrical power source. Such rotation of the impeller 27 in the direction of arrow 30 propels fluid within the impeller and the end caps 13a, 13b in the direction of arrow 31. The propelling of the fluid results from the forces exerted on the fluid by the surfaces of the helical radial vanes 63.

This force may impart a helical motion to the fluid which, in some applications, may be undesirable. Accordingly, end caps 13a and 13b may be comprised of cylindrical members 34a, 34b having internal, axially extending radial vanes 35 which axially straighten the fluid motion and tend to inhibit helical motion of the fluid. Also, vanes 35 provide radial strength and rigidity to the end caps 13a, 13b so that, for example, a hose or other conduit of a fluid line may be clamped over the end caps thereby permitting the pump/motor to be positioned in a fluid line such as the hose connections of a cooling system as discussed below.

Means are provided coaxial with the axial opening of backiron 24 for supporting the rotatable assembly 20 for rotation about its axis 22. In particular, internal radial vanes 63 of the cylindrical member 61 define a bore coaxial with the rotatable assembly axis 22 within which shaft 23 is positioned. The internal axially extending radial vanes of each cylindrical member 34a, 34b of the end caps 13a, 13b also define a bore coaxial with the axis 22 within which bearing means such as brass bearing assemblies 64a, 64b for supporting each end of the shaft 23 is positioned.

Furthermore, the cylindrical members 34a, 34b of end caps 13a, 13b may include a circumferential flange 66 for engaging the ends of the cylindrical member or extrusion 14. In order to seal the endcaps to the extrusion, a seal such as inductive inlet seal 17 and inductive outlet seal 18 are located between the flange 66 and the end of the extrusion. Inductive seals are generally synthetic resin mixed with metallic particles which are heated by a varying magnetic flux field. If inductive seals are employed, the seals are inductively heated which fuses the seals and creates a bond between the end cap and flange. Casing such as cover 59a, 59b may be provided to cover the stationary assembly 10.

For automotive applications, it is contemplated that one preferred embodiment of the invention would have laminations 51 with a diameter of approximately 3.2" so that the gap between the stator bore 57 and segments 25 would be approximately 0.1". These dimensions permit the end caps to have an outside diameter of approximately 1.75" for engaging a hose to have a wall thickness of somewhat less than 0.1".

Figure 4:
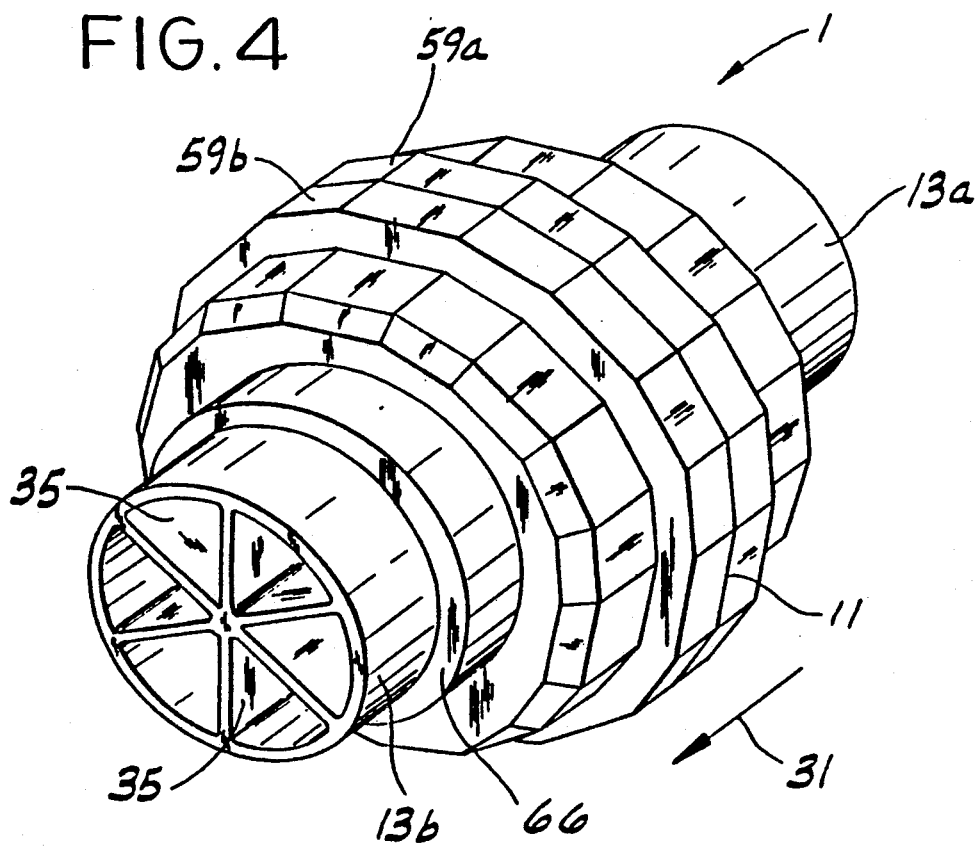
FIG. 4 is a perspective view of an assembled integral pump/motor of the invention.

FIG. 4 illustrates the fully assembled integral pump/motor 1 according to the invention. Cover 59a, 59b is shown surrounding stator 11 which has housing 14 (not visible in FIG. 4) so located within the stator bore that end caps 13a and 13b project from either side of the cover. Rotatable assembly 20 is located within the bore of housing 14.

Figure 5:
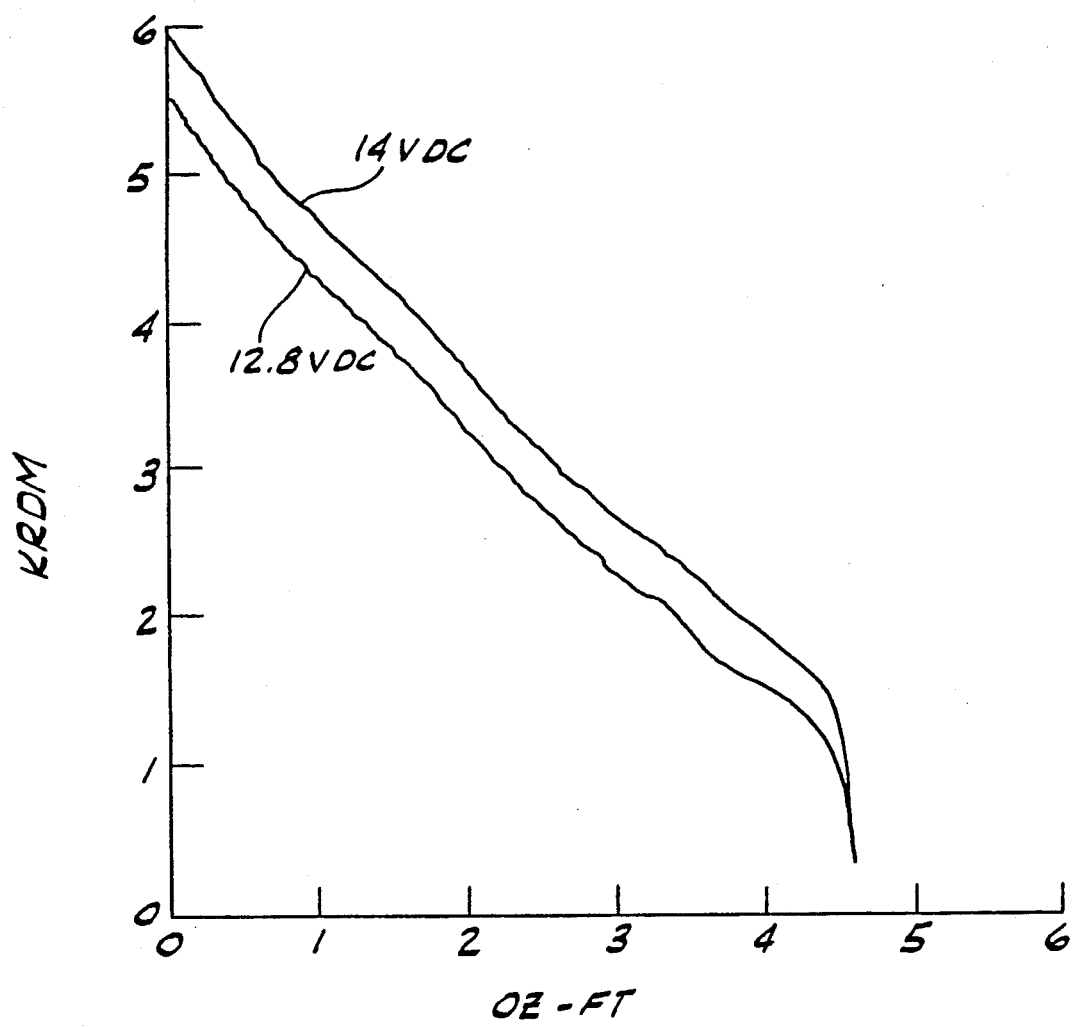
FIG. 5 is a graphical representation of the relationship of torque in ounce-feet (oz-ft) along the x-axis versus thousands of revolutions per minute (KRPM) along the y-axis of an integral pump/motor according to the invention.

In one preferred embodiment of the invention, it is contemplated that the segments 25 have a radial height of 0.15" and a length of 0.88", that the impeller 27 have a wall thickness of 0.08", that the stacked laminations have a width of 0.75", that the resistance of two coils per phase of the windings (each having 37 turns of 0.0339 copper wire) have a resistance of 0.2 ohms per phase and an inductance of 470 microhenrys per phase, and that the no load speed equal 6000 RPM. Position sensing of the rotor assembly 11 would be by sensing the back EMF and the control circuit would be a three phase, half bridge. In this embodiment the flux density of the air gap has been measured to be 0.34 tesla and, as illustrated in FIG. 5, the design load at 3000 RPM (approximately 5 gallons per minute) is approximately 2.2 oz-ft for a 12.8 volt DC power supply and 2.6 oz-ft for a 14.0 volt DC power supply. Such a motor would have a $K_E$ equal to 0.0020 volts per RPM.

Figure 6:
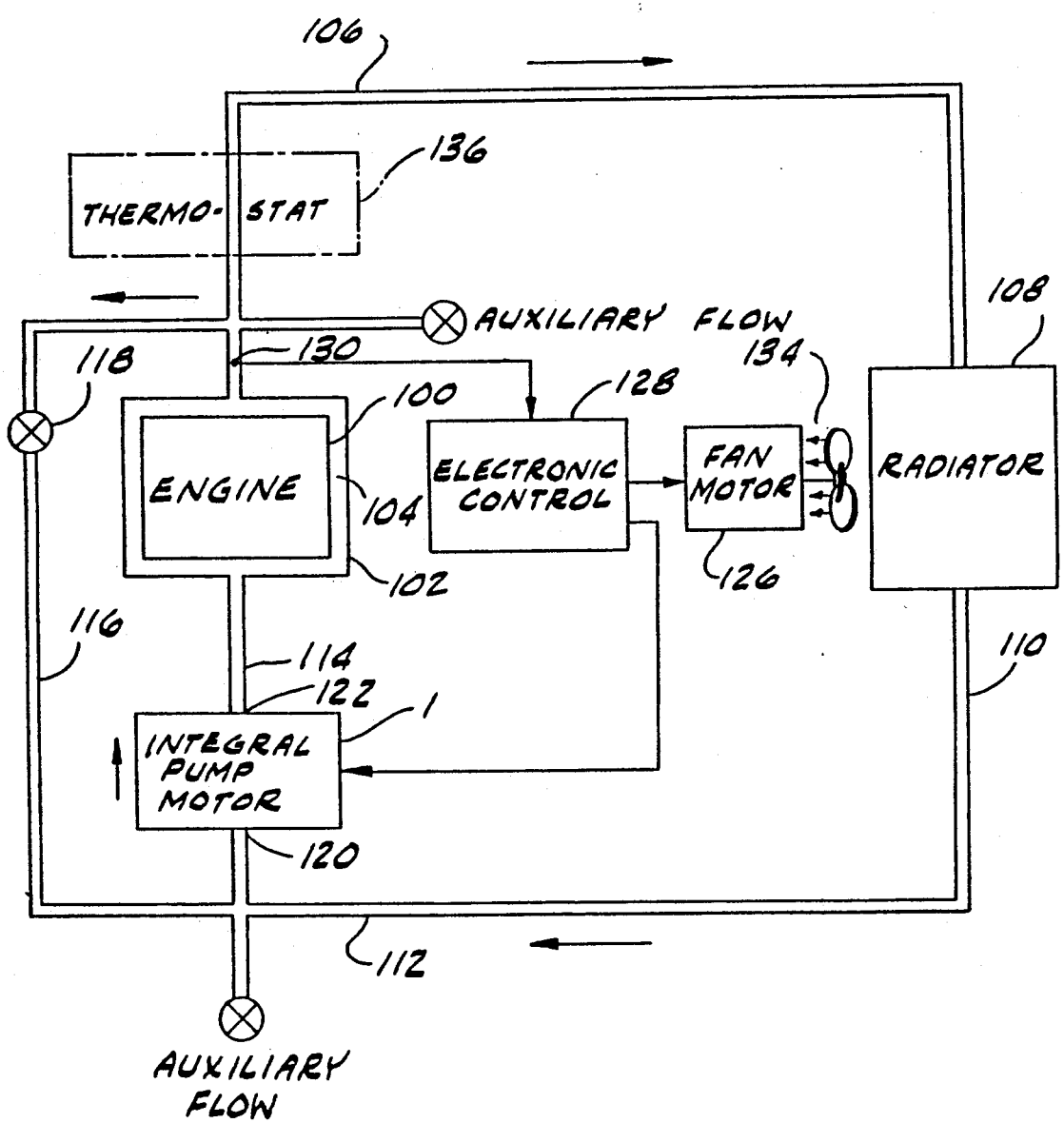
FIG. 6 is a block diagram of an engine cooling system employing the integral pump/motor of this invention.

Referring to FIG. 6, the integral pump/motor 1 according to the invention is shown in block diagram form for use in a cooling system for an engine 100 to pump fluid through the cooling system. For example, engine 100 may be a fluid-cooled, gasoline powered, piston engine such as an automobile engine having a fluid jacket 102 surrounding the engine block to cool the engine block by absorbing heat generated within the block by the operation of engine. In this preferred embodiment the integral pump/motor 1 performs the function of an automotive "water" (fluid) pump. Fluid 104, such as water or an antifreeze/coolant such as ethylene glycol which is within the cooling system, is heated by the heat generated by operation of engine 100. The heated fluid 104 is moved from the water jacket 102 through fluid line 106 to radiator 108 where the fluid is cooled by the air which passes through the radiator. Cooled fluid 110 flows through fluid line 112 to integral pump/motor 1 which pumps the cooled fluid 110 back into the water jacket 102 via line 114. The system may also include a bypass line 116 between lines 112 and 106 with inline valve 118 for controlling the flow of recirculated heated fluid 104. Valve 118 may be used to control the amount of heated fluid 104 flowing through the bypass line 116. The cooling system may be provided with one or more lines for providing auxiliary flow of the fluid. For example, heated fluid 104 may be provided to a carburetor to preheat the air/fuel mixture or to heat the automatic choke valve. Also, the auxiliary flow may be part of a passenger compartment heating system of an automobile in which case heated fluid is directed through a heat exchanger in the passenger compartment. When the integral pump/motor 1 is operating, it pumps fluid from its inlet 120 to its outlet 122 creating a pressure differential which causes fluid within the system to circulate.

Generally, radiator 108 is a heat exchanger well known in the prior art. The radiator 108 includes a plurality of fluid channels in contact with fins over which air passes. The fluid is pumped through the channels by the pressure differential created by the operation of the integral pump/motor 1. Air passes through the radiator and over the fins as the radiator moves through the air as part of a vehicle, or air can be pulled through the radiator by fan blades 124 which are rotated by the fan motor 126. Electronic control 128 controls the operation of the fan motor 126 in response to means for sensing the temperature of the fluid within the cooling system. For example, the temperature of the heated fluid 104 as sensed by temperature sensor 130 may be used to control the operation of the fan motor 126. Such sensors are well known in the prior art and may be thermocouples, thermistors, or any other sensing device in contact with the fluid which provides a signal to electronic control 128 indicative of temperature of the fluid being monitored. Such controls are also well known in the prior art. For example, if the temperature of the heated fluid is higher than a certain desired maximum, say 240° F., electronic control 128 would activate fan motor 126 to rotate fan blades 124. This results in air flowing in the direction of arrows 134 over the fins of the radiator 108 thereby cooling the fluid within the channels of the radiator. Control 128 would operate fan motor 126 until the temperature differential becomes greater than the desired minimum or the temperature of the heated fluid falls below the desired maximum Control 128 constitutes means responsive to the temperature sensing means for supplying electrical power to the stator assembly of integral pump/motor 1. Presently, such a temperature sensor is located in the cylinder head of an automobile to measure coolant temperature therein. An electronic control in the form of a microprocessor that controls the emission control system and the fan motor operation in response to the measured temperature It is contemplated that this microprocessor may be used to control the integral pump/motor 1.

The cooling system may also be provided with an automotive thermostat in the form of a thermostatically controlled valve 136 (shown in phantom in FIG. 6) for inhibiting the flow of fluid within the system until the operating temperature of the fluid is reached. As is well known in the prior art, such valves 136 are normally closed. As the temperature of the fluid in the water jacket 102 increases, such valves are heated by the heated fluid 104 and mechanically open to permit circulation of the fluid within the cooling system. The purpose of such valves is to permit the fluid within the water jacket 102 to quickly reach operating temperature before fluid circulation begins. In prior art systems employing mechanical "water" (fluid) pumps which operate continuously whenever the engine is running, such valves selectively inhibit fluid flow. In a system according to the invention, valve 136 is optional because fluid flow is controlled by actuation or deactuation of integral pump/motor 1. Control 128, for example, would not supply electrical power to the stator assembly of integral pump/motor 1 until the fluid 104 in the water jacket has reached operating temperature.

It is contemplated that the integral motor/pump 1 may be operated at fixed or variable speeds. For example, in fixed speed operation, integral pump/motor 1 would be activated at one or more fixed speeds or torques simultaneously with fan motor 126 by electronic control 128 selectively providing power thereto. Optionally, the particular operating speed or torque of integral pump/motor 1 may be made dependent on various operating conditions of the automobile such as the temperature of the heated fluid 104 and the cooled fluid 110, the air temperature, the engine operating speed and/or the need to supply heated fluid via the auxiliary flow. For example, integral pump/motor 1 may be selectively actuated in response to the need for heating of the passenger compartment.

In variable speed/torque operation, the speed or torque of the integral pump/motor 1 is controlled and varied to meet the needs of the automobile in response to the various operating conditions of the automobile. For example, the control as disclosed in U.S. Pat. Nos. 4,459,519 and 4,556,827, incorporated herein by reference, or as disclosed in co-assigned, copending patent application Ser. No. 015,409, incorporated herein by reference, may be employed to control operation of integral pump/motor 1.

Although FIG. 6 illustrates integral pump/motor 1 in line between fluid line 112 and the water jacket 102, it is contemplated that it may be located in any line of the cooling system and at any point along the fluid flow path.

In one mode of operation of the invention, it is contemplated that the integral Pump/motor 1 may be operated after engine 100 has completed its operating cycle and has been turned off. For example, consider an automobile engine that has operated for a period sufficient to permit the cooling fluid to reach a stable operating temperature. When the engine is turned off after this operating period, heat from the engine block continues to be transferred to the fluid in water jacket 102 because the block is substantially hotter than the fluid 104. The heated fluid 104 may migrate by convection flow into lines 106 and 114 and possibly into pump/motor 1. As a result, the migrated fluid subjects the cooling system parts which it contacts to increased temperatures (a temperature spike) which, in turn, may result in damage and/or decreased useful life of the parts.

Operation of fan motor 126 alone after the engine operating period ends is well known in the prior art but fails to significantly reduce the temperature spike to which cooling system parts are subjected because no fluid is circulating within the cooling system (other than a small amount of migrating fluid flowing by convection). As a result, operation of fan motor 126 alone after the engine operating period only prevents a temperature spike within radiator 108. Some of the parts of the cooling system adjacent to the radiator 108 may be cooled because some of the cooled fluid may migrate as a result of convection flow into parts of the cooling system adjacent to the radiator 108. Prior art mechanical, automotive "water" pumps cannot solve the temperature spike problem because such pumps can only operate when the engine operates.

By operating both the integral pump/motor 1 and fan motor 125 for a short period after engine operation, heat build-up within the engine block can be quickly dissipated throughout the cooling system and released to the air through radiator 108. In cooling systems in which the fluid volume has sufficient mass to absorb the heat buildup within the engine block without a significant temperature rise and without the need for cooling, it may only be necessary to operate integral pump-motor 1 at a low speed or torque and not operate fan motor 126 at all after the engine 100 is turned off. Control 128, which would control the integral pump/motor 1 operation, constitutes power supply means for supplying electrical Power to the stator assembly of integral pump/motor 1 during and subsequent to operation of the automobile engine 100 whenever the temperature of the fluid 104 is above a predetermined temperature (say 240°).

The above-described operation of the cooling system illustrated in FIG. 6 constitutes a method of circulating fluid within a system such as a cooling system of an automobile engine. By connecting line 114 to the inlet 120 and outlet 122 of integral pump/motor 1, a rotatable assembly 20 including impeller 27 is located within extrusion 14 connected to the system. Control 128 provides electrical power to the stator assembly 11 and thereby applies an electromagnetic field through the extrusion 14 to and around the rotatable assembly thereby to axially rotate the impeller 27 and cause it to move fluid through the extrusion 14. Sensors 130 and 132 sense the temperature of the fluid within the system and, in conjunction with control 128, selectively energize stator assembly 11 to selectively apply the electromagnetic field in response to the temperature of the sensed fluid. The electromagnetic field may be applied during and subsequent to operation of the automobile engine 100 whenever the temperature of the fluid 104 is above a predetermined temperature.

In view of the above, it will be seen that the several objects of the invention are achieved and other advantageous results attained As various changes could be made in the above constructions and methods without departing from the scope of the invention, it is intended that all matter contained in the above description or shown in the accompanying drawings shall be interpreted as illustrative and not in a limiting sense.

What is claimed is:

1. Apparatus for use in a cooling system to pump fluid through the cooling system, said apparatus comprising:

a housing having a continuous passage therethrough, the passage having an inlet and an outlet adapted to be connected in the cooling system;

first means, located entirely within the passage in the housing and adapted to rotate within the passage in the housing, for moving fluid from the inlet to the outlet;

means located entirely within the inlet and the outlet for supporting the first means for rotation about an axis coaxial with the inlet and the outlet;

means for sensing the temperature of the fluid in the cooling system;

second means secured to the exterior of the housing for applying an electromagnetic field through the housing to and around the first means thereby to rotate the first means and cause it to move fluid through the passage in the housing from the inlet to the outlet to pump fluid through the cooling system; and means, responsive to said temperature sensing means, for supplying electrical power to said second means.

2. The apparatus of claim 1 wherein the cooling system is a cooling system of an automobile engine and wherein said means for supplying electrical power includes power supply means for supplying electrical power to said second means during and subsequent to operation of the automobile engine whenever the temperature of the fluid is above a predetermined temperature.

3. The apparatus of claim 1 further comprising a heat exchanger adapted to release heat from the fluid to ambient air and a conduit for conducting the fluid between the cooling system and said heat exchanger and wherein said housing is positioned in-line with said conduit.

4. The apparatus of claim 3 wherein the cooling system is a cooling system of an automobile engine having a fluid jacket and wherein said heat exchanger comprises a radiator for exchanging heat from the fluid to ambient air; and further comprising a fan for moving ambient air through the radiator, and wherein said means for supplying electrical power includes a power supply supplying electrical power to said second means and said fan during and subsequent to operation of the cooling system during periods in which the temperature of the fluid is above a predetermined temperature.

5. The apparatus of claim 4 further comprising means for bypassing said radiator to recirculate fluid between said fluid jacket and said first means.

6. The apparatus of claim 1 wherein the cooling system is a cooling system of an automobile engine having a fluid jacket and wherein said cooling system comprises a radiator for exchanging heat from the fluid to ambient air; and further comprising a fan for moving ambient air through the radiator, and wherein said means for supplying electrical power includes a power supply supplying electrical power to said second means and said fan during and subsequent to operation of the cooling system during periods in which the temperature of the fluid is above a predetermined temperature.

7. The apparatus of claim 6 further comprising means for bypassing said radiator to recirculate fluid between said fluid jacket and said first means.

8. A method of circulating fluid within a system comprising the steps of:
  locating a rotatable assembly including an impeller entirely within a housing which is connected in the system, said housing having means located entirely within an inlet and an outlet of the housing for supporting the rotatable assembly for rotation about an axis coaxial with the inlet and the outlet;
  applying an electromagnetic field through the housing to and around the rotatable assembly thereby to rotate the impeller and cause it to move fluid through the housing;
  sensing the temperature of the fluid in the system; and
  selectively performing said applying step in response to the temperature of the sensed fluid.

9. The method of claim 8 wherein the system is a cooling system of an automobile engine and wherein said applying step is selectively performed during and subsequent to operation of the automobile engine whenever the temperature of the fluid is above a predetermined temperature.

10. An apparatus for circulating fluid within a cooling system comprising:
  a housing having an inlet and an outlet connected to the cooling system;
  a rotatable assembly including an impeller entirely within the housing;
  means located entirely within the inlet and the outlet for supporting the rotatable assembly for rotation about an axis coaxial with the inlet and the outlet;
  a stationary assembly having a plurality of winding stages adapted to be energized to apply an electromagnetic field through the housing to and around the rotatable assembly thereby to rotate the impeller and cause it to move fluid through the housing;
  means for sensing the temperature of the fluid in the system; and
  means for energizing said winding stages as a function of the sensed fluid temperature.

11. Apparatus for circulating fluid in a cooling system of the type having a continuous passage having an inlet and an outlet for the circulation of cooling fluid, said apparatus comprising:
  first means located entirely inside the passage and freely rotatable inside the passage for moving fluid through the passage;
  means located entirely within the inlet and the outlet for supporting the first means for rotation about an axis coaxial with the inlet and the outlet;
  second means outside of the passage for applying an electromagnetic field through a portion of the passage, to and around the first means, to rotate the first means inside the passage and cause it to move fluid through the passage from the inlet to the outlet;
  means for sensing the temperature of the fluid in the passage; and
  means responsive to said temperature sensing means for supplying electrical power to said second means to apply the electromagnetic field.

12. Apparatus for cooling fluid heated by a source of heat, said apparatus comprising:
  means for cooling the fluid;
  conduit means for conducting fluid between the source of heat and the means for cooling;
  a housing having an inlet and outlet connected in the conduit means;
  first means, located entirely within and adapted to rotate within the housing, for moving fluid through the housing from the inlet to the outlet;
  means located entirely within the inlet and the outlet for supporting the first means for rotation about an axis coaxial with the inlet and the outlet;
  means for sensing the temperature of the fluid;
  second means secured to the exterior of the housing for applying an electromagnetic field through the housing to and around the first means thereby to rotate the first means and cause it to move fluid through the housing from the inlet to the outlet; and
  means responsive to said temperature sensing means, for supplying electrical power to said second means.

* * * * *